(12) United States Patent
Robere et al.

(10) Patent No.: US 10,486,674 B2
(45) Date of Patent: Nov. 26, 2019

(54) BRAKE PAD LIFE PROGNOSIS SYSTEM FOR REGENERATIVE BRAKING VEHICLES

(71) Applicant: GM GLOBAL TECHNOLOGY OPERATIONS LLC, Detroit, MI (US)

(72) Inventors: Matthew A. Robere, Novi, MI (US); Mark T. Riefe, Brighton, MI (US); David B. Antanaitis, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 15/693,891

(22) Filed: Sep. 1, 2017

(65) Prior Publication Data

US 2019/0071062 A1    Mar. 7, 2019

(51) Int. Cl.
*B60T 17/22* (2006.01)
*B60L 7/10* (2006.01)
*B60L 7/24* (2006.01)
*F16D 66/02* (2006.01)
*F16D 66/00* (2006.01)

(52) U.S. Cl.
CPC .............. *B60T 17/221* (2013.01); *B60L 7/10* (2013.01); *B60L 7/24* (2013.01); *F16D 66/021* (2013.01); *F16D 2066/006* (2013.01)

(58) Field of Classification Search
CPC .............. B60T 17/221; F16D 66/021; F16D 2066/006; B60L 7/10; B60L 7/24
See application file for complete search history.

(56) References Cited

U.S. PATENT DOCUMENTS

| | | | | |
|---|---|---|---|---|
| 2008/0236269 | A1* | 10/2008 | Howell | ................... B60T 17/221 73/121 |
| 2016/0138665 | A1* | 5/2016 | Antanaitis | ............. F16D 66/026 701/70 |
| 2017/0045890 | A1* | 2/2017 | Gurin | ................. G06Q 10/0836 |
| 2018/0134161 | A1* | 5/2018 | Gaither | ................. B60L 3/0076 |

* cited by examiner

*Primary Examiner* — Rodney A Butler
(74) *Attorney, Agent, or Firm* — Cantor Colburn LLP (57) ABSTRACT

A system for determining thickness of a brake pad includes a controller configured to provide a total braking energy of a vehicle with a regenerative energy braking system, and a rotor braking system that includes a plurality of brake pads. The system controller determines the work done by the brake pads as a combination of front brake pad work and rear brake pad work, then accumulates the brake pad wear to provide an estimation of the brake pad thickness using the front brake pad work and the rear brake pad work. The controller outputs a message indicative of the estimation of the brake pad thickness via an output system in communication with the controller

18 Claims, 3 Drawing Sheets

BRAKE PAD LIFE PROGNOSIS SYSTEM FOR REGENERATIVE BRAKING VEHICLES

INTRODUCTION

The subject disclosure relates to a system for estimating brake pad thickness as it wears from use, and more particularly to a system for brake pad life prognosis for regenerative braking vehicles.

Vehicle brake pads typically last between 20,000 and 80,000 miles depending on the type of driving, i.e., city, highway, rural, etc., where the average brake pad life is about 50,000 miles. The thickness of the brake pad gradually decreases as a result of wear as it is used. When the thickness of the brake pad becomes sufficiently small, a mechanical scraper may make contact with the brake pad. The mechanical scraper makes an annoying high frequency noise, which is an unfriendly reminder that the brake pad needs to be replaced. Although the noise does alert the vehicle operator that the brake pad is worn out, it does not give the vehicle operator advanced warning, or a continuous determination of the lining thickness, only that the brake pad has worn down to a low level. Therefore, for example, if a long trip is planned, there is no indication that the brake pads may not last the journey.

It is known in the art to provide a sensor that determines brake pad thickness as it wears. For example, sensors are known that include one or more wires extending across the brake pad at certain thickness levels so that when the wire breaks, the sensor will provide an indication that the brake pad thickness has been reduced a certain amount. However, such sensors are typically expensive, and do not provide a continuous indication of brake pad thickness through the life of the brake pad.

Other systems provide an estimation of brake pad thickness based on operating conditions of the vehicle, such as brake work performed by the brake system. But existing systems are not compatible with regenerative braking systems.

Accordingly, it is desirable to provide a brake life prognosis system that combines an energy partitioning model with braking energy parameters to accurately predict brake pad thickness. It is also desirable for the prognosis system to output real-time brake life information that is useful to an end user.

SUMMARY

In one exemplary embodiment a method for determining thickness of a brake pad is described. The method includes providing, via a processor, a total braking energy of a vehicle with a regenerative energy braking system and a rotor braking system comprising a plurality of brake pads. The processor then determines the work done by the brake pads as a combination of front brake pad work and rear brake pad work. The processor accumulates brake pad wear to provide an estimation of the brake pad thickness using the front brake pad work and the rear brake pad work and outputs, via an output system in communication with the processor, a message indicative of the estimation of the brake pad thickness.

In another exemplary embodiment, a system for determining thickness of a brake pad includes a controller configured to provide a total braking energy of a vehicle with a regenerative energy braking system, and a rotor braking system that includes a plurality of brake pads. The system controller determines the work done by the brake pads as a combination of front brake pad work and rear brake pad work, then accumulates the brake pad wear to provide an estimation of the brake pad thickness using the front brake pad work and the rear brake pad work. The controller outputs a message indicative of the estimation of the brake pad thickness via an output system in communication with the controller.

In another exemplary embodiment, a non-transitory computer-readable medium storing instructions is described. The computer-readable medium includes instructions executable by a processor for performing a method for determining thickness of a brake pad. The method includes providing, via the processor, a total braking energy of a vehicle with a regenerative energy braking system and a rotor braking system comprising a plurality of brake pads. The processor then determines the work done by the brake pads as a combination of front brake pad work and rear brake pad work. The processor accumulates brake pad wear to provide an estimation of the brake pad thickness using the front brake pad work and the rear brake pad work and outputs, via an output system in communication with the processor, a message indicative of the estimation of the brake pad thickness.

In yet another exemplary embodiment, determining the work done by the brake pads includes providing deceleration parameters.

In another exemplary embodiment, determining the work done by the brake pads includes providing regenerative blending signals indicative of a relative portion of overall brake energy.

In yet another exemplary embodiment, determining the work done by the brake pads further includes providing motor data indicative of regenerative brake energy harvested by a motor generator.

In another exemplary embodiment, accumulating the brake pad wear includes providing brake pad friction material, brake pad cooling rate, vehicle mass, road grade, dynamic brake proportioning, vehicle weight distribution, vehicle speed, wheel speed and brake pressure.

In yet another exemplary embodiment, determining the front brake pad work and the rear brake pad work includes determining brake pad work at a particular wheel of the vehicle.

The above features and advantages, and other features and advantages of the disclosure, are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
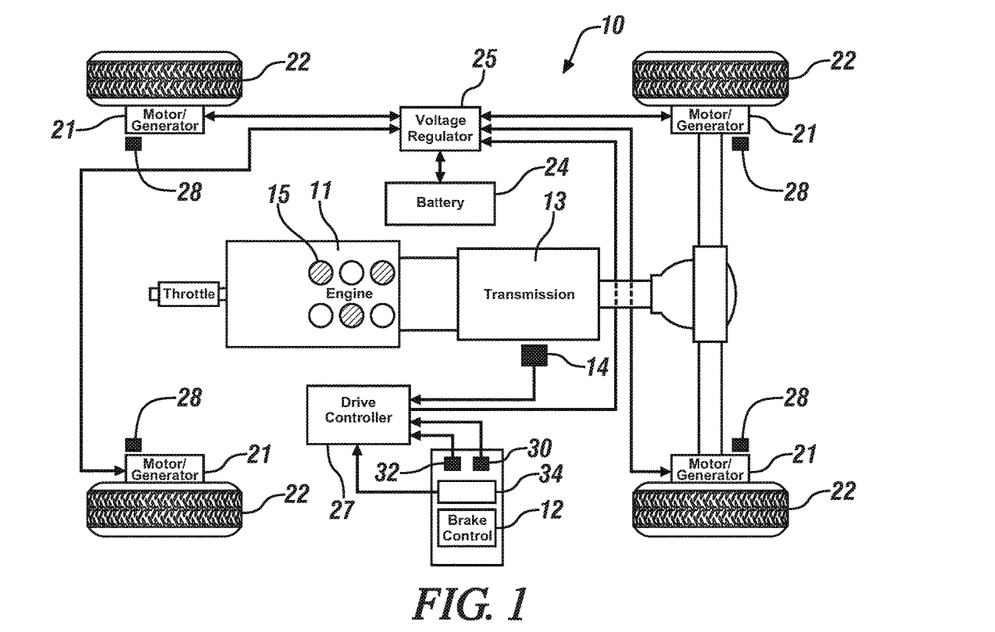
FIG. 1 is a schematic view of a system for determining brake pad thickness according to one exemplary embodiment.

Referring now to FIG. 1, a vehicle 10 may include an engine 11 that drives a transmission 13. The engine 11 may be a combustion engine as known in the art. In other aspects, the vehicle 10 may be fully-electric and may not include a combustion engine. The vehicle 10 further includes one or more motor generators 21 that selectively drive or are driven by the wheels 22. For example, when vehicle 10 is operating in an electric motor-driven mode, one or more motor generators 21 drive the wheels 22 and are powered by a battery 24. When the vehicle 10 is braking, the motor generators 21 are driven by the wheels 22 to slow rotation of the wheels 22 and to produce current that is used to charge the battery 24. The production of current in this way is referred to in the art as regenerative braking. The battery 24 communicates with the motor generators 21 via a voltage regulator 25. Some vehicles may include both of the engine 11 and the motor generators 21, and as such, may include an electric mode and a separate engine drive mode. In the electric mode, the voltage regulator 25 regulates driving current from the battery 24 to the motor generators 21. In the braking mode, the voltage regulator 25 regulates charging current from the motor generators 21 to the battery 24. When in braking mode, the generation of power by the motor generators 21 also functions to slow the vehicle 10.

A drive controller 27 communicates with the engine 11, a power train controller 14, a brake controller 12, and the voltage regulator 25. The drive controller 27 continuously monitors driving conditions to selectively power the vehicle 10 electrically and/or using the engine 11. If the conditions are proper for electric drive, the drive controller 27 deactivates the engine 11 and drives the vehicle 10 with the motor generators 21 in the motor mode. When the brake is depressed, the drive controller 27 receives a brake signal. In response, the drive controller 27 operates the motor generators 21 in the generator mode to retard motion of the vehicle 10 and signals the voltage regulator 25 to charge the battery 24 using current generated by the motor generators 21.

Figure 2:
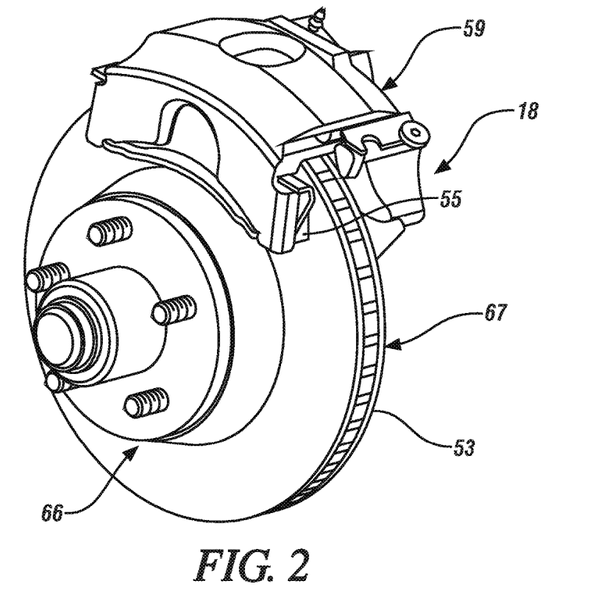
FIG. 2 is a schematic view of components of a disc brake system of a vehicle according to one or more exemplary embodiments.

The vehicle 10 can include mechanical brake systems in addition to the regenerative braking system. FIG. 2 depicts example components of a disc brake system 18 of a vehicle according to one or more embodiments. It should be noted that in other examples, the disc brake system 18 may include additional, fewer, and/or different components than those illustrated here. The disc brake system 18 includes a brake rotor 53 and brake pads 55. In one or more examples, the rotor 53 is also referred to as a disc. The disc brake system 18 further includes a brake caliper assembly 59. In one or more examples, the rotor 53 has brake pad-contacting surfaces 66, 67. When a vehicle operator steps on a brake pedal of the vehicle 10, hydraulic fluid is pressurized in a brake hose connected to the brake caliper assembly 59 and forces the brake pads 55 of the brake caliper assembly 59 against both surfaces 66, 67 of the rotor 53, which is rotating with a wheel 22 of the vehicle. The frictional engagement between the brake pads 55 and the surfaces 66, 67 of the rotating rotor 53 serves to slow, and possibly stop, the vehicle wheel. The brake pads 55 will wear down over time from the mechanical friction and heat generated by contact with the rotor 53.

The technical solutions described herein facilitate using sensor information, driver braking information, and driver brake models to predict or estimate brake pad thickness, and provide an indication of remaining brake pad life. This may include determining remaining miles of life left in brake pad operation or a percentage of brake pad thickness. According to some embodiments, a system controller will report the remaining life of the brake pads to a vehicle operator. As will be discussed in detail below, the brake pad thickness estimation algorithm uses various parameters and sensor signals to provide the estimation, including, but not limited to, brake rotor material properties, brake rotor cooling rate, brake temperature, vehicle mass, road grade, dynamic brake proportioning, vehicle weight distribution, brake pressure applied, braking energy, braking power, and regenerative energy generation with respect to particular wheels and vehicle 10 portions (e.g., front and rear) etc.

The regenerative braking system disclosed herein uses displacement on demand (DOD) in an electric/electric-hybrid (such as vehicle 10) to increase the current generated to recharge the battery 24. Specifically, if the engine 11 is powering the vehicle 10 and braking is initiated by an operator, cylinders 15 of the engine 11 may be deactivated to reduce engine 11 braking. The motor generators 21 are able to absorb an increased amount of the vehicle's kinetic energy to produce current to charge the battery 24.

Figure 3:
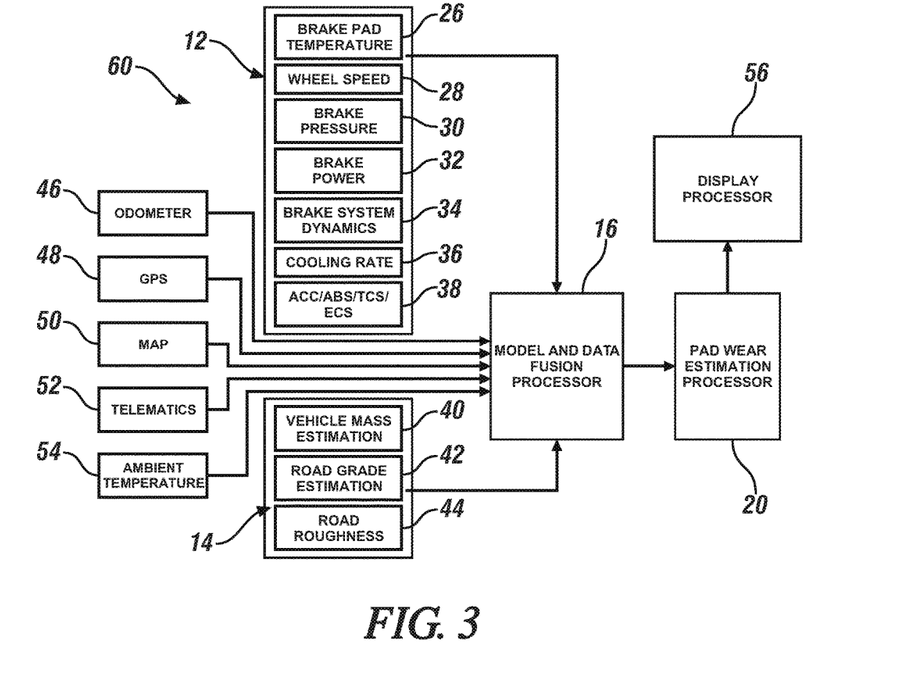
FIG. 3 is a block diagram of an exemplary brake pad life prognosis system according to one or more exemplary embodiments.

FIG. 3 is a block diagram of a brake pad life prognosis system 60 (hereafter "system 60"), according to one or more embodiments. Considering FIG. 3 in conjunction with FIG. 1, the system 60 includes the brake controller 12 and the power train controller 14. Further, the system 60 includes a model and data fusion processor 16 and a brake pad estimation processor 20. The brake pad estimation processor 20 outputs prognostic brake pad information to a display processor 56. The display processor 56 outputs the messages to a display in the cabin of the vehicle 10 to inform a user.

The brake controller 12 includes a brake pad temperature estimation processor 26, wheel speed sensors 28, a brake pressure processor 30 and a brake power calculation processor 32 (shown in FIG. 1). Additionally, the brake controller 12 includes a brake system dynamics processor 34 providing brake system dynamics, a processor 36 providing brake cooling rate, and a multi-function processor 38 that provides signals from an anti-lock brake system (ABS), traction control system (TCS), electronic control system (ECS) and an active cruise control (ACC). All or most of the calculations done in the processors 26-38 are currently available on vehicles and/or are well known to those skilled in the art.

The power train controller 14 includes a vehicle mass estimation processor 40, a road grade estimation processor 42 and a road roughness estimation processor 44. Additional signals may be available for estimating the brake pad thickness, such as a vehicle odometer 46, GPS signals 48, map information 50, vehicle telematics 52 and an ambient temperature sensor 54. All of the signals provided by these processors and devices are also typically available on a vehicle, and would be readily available to those skilled in the art.

The brake pad temperature estimation processor 26 estimates the temperature of the brake rotor 53. Depending on the brake rotor material, the brake rotor wear may be based on the temperature of the brake rotor 53. The cooling rate of the brake rotor helps determine the brake rotor temperature, and may be based on the vehicle design, vehicle speed, wheel speed, ambient temperature, altitude, etc. As the vehicle is operated, the air flowing around the brake pads 55 and the brake rotor 53 will determine how fast the brake pads 55 are cooled from the previous braking event. In one or more examples, the brake rotor and/or brake pad temperature is measured with sensors. However, such sensors are expensive, and thus, an algorithm estimating the brake pad temperature is used in one or more embodiments.

The brake pressure processor 30 estimates the braking energy dissipation in the disc brake system 18. This calculation uses various inputs, such as stopping distance, stopping time, brake rotor temperature, etc. To determine the brake pressure, the brake pressure processor 30 can use any one or more of a master cylinder pressure of the disc brake system 18 (not shown), a weight distribution in the vehicle, and a dynamic brake proportioning for the proportional brake pressure at each wheel. The dynamic brake proportioning is based on where the weight in the vehicle 10 is distributed, and is a known calculation.

The vehicle mass estimation processor 40 estimates the vehicle 10 mass, typically based on the engine 11 torque, and is a process well known to those skilled in the art. The mass of the vehicle 10 may change as a result of the number of passengers, load in the trunk, fuel capacity, etc. Further, it is known in the art to estimate the road grade in the road grade estimation processor 42 in combination with the estimation of the vehicle 10 mass.

The processor 20 can calculate the braking energy using equation (14) below. The braking energy is the work done by the brakes to decelerate the vehicle, and is the total work minus the rolling resistance, the aerodynamic drag, the engine braking and the road grade. The brake work can be used to calculate the power dissipated by the brakes, where power equals work/time. The power can be calculated at predetermined time intervals, for example, every 140 ms, during the braking event.

$$\text{BrakingEnergy} = \tfrac{1}{2}M(V_I^2 - V_F^2) - E_{RR} - E_G - E_E \qquad \text{Equation (14)}$$

In equation (14), M is the mass of the vehicle, Energy Rolling Resistance ($E_{RR}$) is the energy required to roll the vehicle 10 on a flat grade, which is a known value and can be represented as a function of vehicle speed. For example $E_{RR} = aV^2 + bV + C$, where V is vehicle velocity and a, b, c are predetermined coefficients. Further, in equation (14), $E_G$ (G=Grade) is the energy required to roll the vehicle as a result of the grade of the road, which is also a known value, $E_E$ (E=Engine) is the braking provided by the engine itself, and is also a known value, $V_I$ is the velocity of the vehicle 10 at the beginning of the braking event and $V_F$ is the velocity of the vehicle at the end of the braking event. In an alternate embodiment, vehicle 10 deceleration can be used instead of the vehicle speed V, and can be provided by a longitudinal acceleration sensor.

The braking power dissipated by the braking event can also be estimated as power=force*velocity. Braking force can be calculated by the processor 20 as:

$$\text{BrakingForce} = \text{Pressure} * \text{Area} * \mu \qquad \text{Equation (2)}$$

In Equation (2) $\mu$ is the friction coefficient of the brake rotor 53, which is a function of the rotor temperature, and area is the surface area of the brake rotor 53.

Alternately, the braking power can be calculated by the processor 20 as:

$$\text{BrakingForce} = \frac{\text{Torque}}{\text{RollingRadius}} \cdot \text{Velocity} \qquad \text{Equation (3)}$$

In Equation (3), the torque is calculated for both the front and the rear of the vehicle and is a function of the brake pressure and the dynamic brake proportioning. The Rolling Radius is the rolling radius of the wheel and velocity is the vehicle velocity.

In one or more examples, the integration of the applied braking force is input into a physical thermal model for first order dynamics to determine an estimate of the brake temperature. Brake dynamometer tests can be used to obtain the brake pad friction coefficient as a function of temperature. The tests are used to determine the amount of wear expected at different rotor temperatures, and the thermal model is configured accordingly.

Further, the force required to stop the vehicle can be estimated by the processor 20 as:

$$\text{Force} = \text{Mass} * \text{Acceleration} \qquad \text{Equation (4)}$$

The front/rear brake proportioning information and the cornering information available from the brake system dynamics processor 34 is used to determine the power distribution on each axle and corner. The vehicle mass estimation is available from the power train controller 14, and is also used in these equations. From the braking energy or the braking power, the brake rotor temperature can be determined as a proportional value, and from the brake rotor temperature, the brake rotor wear can be determined as a proportional value. For example, one or more look-up tables in the brake pad estimation processor 20 facilitate determining the proportional values. The look-up table(s) are populated based on the relationship between the braking energy and the brake rotor temperature and the brake rotor temperature and the brake rotor wear based on the calculations discussed above and the properties of the brake rotor. Each time the system 140 calculates the wear of the brake rotor, it is added to the previous calculations of wear over time, and can then be extrapolated from the vehicle mileage to determine the remaining mileage for each brake rotor. Alternatively, or in addition, instead of using look-up tables, in one or more examples, the brake pad estimation processor 20 determines the rotor wear dynamically using a predetermined computation formula that is based on the relationship between the braking energy and the brake rotor temperature and the brake rotor temperature and the brake rotor wear.

Further, the processor 20 uses a combination of the above available information to estimate oxidation of the rotor 53. For example, the processor 20 uses an oxidative wear model for the material of the rotor 53 to determine how much the rotor 53 has worn based on the combination of the above available information. For example, the oxidative wear model uses a time of exposure of the rotor 53 and an oxidative wear parameter that is a predetermined configurable value.

In one or more examples, the oxidative wear parameter is based on a type of the rotor 53, for example, material, shape, dimensions, and other parameters of the rotor 53. The oxidative wear parameter represents a rate of penetration of oxides into the rotor material. In one or more examples, the time of exposure of the rotor 53 is monitored from the time since manufacture of the vehicle and/or since the rotor 53 is serviced. The processor 20 measures a time associated with each braking event. For example, the processor 20 measures the amount of time the vehicle operator holds the brake pedal down to cause the vehicle to slow down. The measured time is accumulated by the processor 20 to provide the time of exposure of the rotor 53. Alternatively, or in addition, the time of exposure is time measured since the rotor 53 is installed on the vehicle. The time of exposure is reset when the rotor 53 is replaced. In one or more examples, a vehicle subsystem, such as a vehicle computer, keeps track of the time since the rotor in installed on the vehicle and provides access to the value when requested.

Scaling the time of exposure with the oxidative wear parameter provides an amount (for example, in millimeters or micrometers) of corrosion of the rotor 53. Alternatively, in one or more examples, the model and data fusion processor 16 uses a look-up table to determine the amount of corrosion of the rotor based on the time of exposure, the look-up table including corrosion values based on the oxidative wear parameter. The oxidative wear parameter is the rate of corrosion for the brake rotor 53. In one or more examples, the oxidative wear parameter is adjusted according to a vehicle location, for example which are available from a global positioning system (GPS) of the vehicle 10. For example, the model and data fusion processor 16 uses a look-up table to determine the oxidative wear parameter to use based on location coordinates received from the GPS. The location coordinates may be used to identify a geographic region, such as a city, a state, or the like, and an oxidative wear parameter corresponding to the geographic region is then used for determining the corrosion of the rotor 53.

Figure 4:
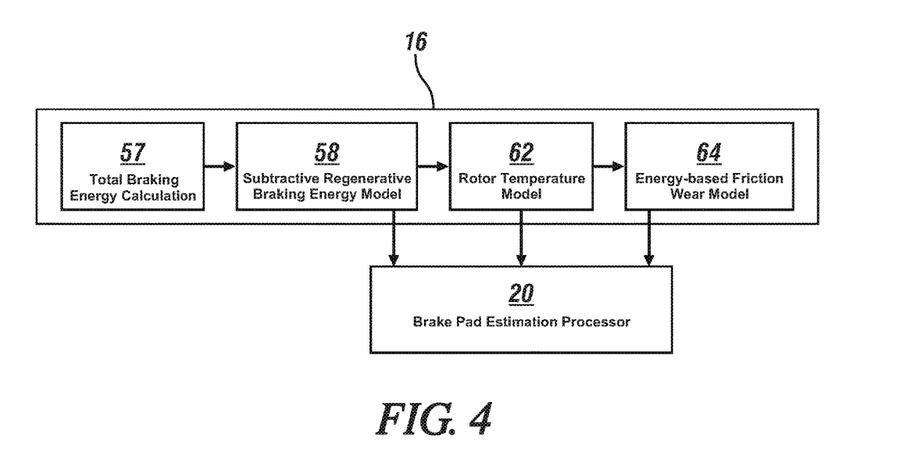
FIG. 4. is a block diagram of a model and data fusion processor according to one or more exemplary embodiments.

FIG. 4 depicts an example block diagram of the model and data fusion processor 16 according to one or more embodiments. The model and data fusion processor 16 (hereafter "processor 16") uses a combination of the above available information to estimate the thickness of the brake pads 55. The processor 16 uses a total braking energy calculation 57 that accounts for energy that is re-captured by deceleration using the power generated by the motor generators 21. For example, the total braking energy calculation is an input for a subtractive regenerative braking energy model 58 (hereafter "regen braking model 58").

According to some embodiments, the regen braking model 58 provides vehicle parameters that includes deceleration data attributed to one or more of the motor generators 21. Because weight distribution of the vehicle 10 can vary the amount of stopping friction (or regenerative energy transfer) per wheel, the regen braking model 58 includes parameters including a combination of the front brake pad work and the rear brake pad work. As an example, the front brake pad work can account for energy at the front wheels only. The rear brake pad work can account for the energy at the rear wheels only. According to one or more embodiments, the brake pad work respective to the front of the vehicle 10 and the rear of the vehicle 10 can be accumulated and subtracted from the energy calculation at the rotor temperature model 62. Accordingly, the energy-based friction wear model 64 will be based on the true energy absorbed by the brake pads 55 and the rotor 53, which would have been skewed absent the subtractive regenerative braking energy model 58.

Accordingly, the regen braking model 58 subtracts an accumulation of the braking forces absorbed by the regenerative braking system, and feeds the adjusted energy into the rotor temperature model to determine a temperature of the rotor 53 and the brake pads 55. The processor 16 further uses a rotor energy calculation to determine braking energy that is absorbed by the rotor 53 and the brake pads 55.

Based on the rotor temperature and the rotor braking energy absorbed, the processor 16 determines a corrosion or wear of the brake pads 55 according to the energy-based wear model 64. The processor 16 uses a wear volume per unit of energy absorbed by the rotor to determine how much the rotor 53 and the brake pads 55 have worn based on the model 64. For example, the processor 16 determines an energy-based wear of the rotor 53 according to a volume of wear per energy units absorbed at the determined temperature. As another example, the processor 16 computes the energy units absorbed by the rotor 53 and the brake pads 55 at a braking event at the determined temperature using the equations described herein. Further, a volume of wear of the rotor 53 and the brake pads 55 is computed by multiplying the computed energy-based wear by a surface area of the rotor 53.

The processor 16 computes the energy based wear periodically at a predetermined frequency, such as 140 ms, 20 ms, or any other predetermined frequency. Alternatively, or in addition, the processor 16 computes the wear every time a braking event occurs.

The processor 16 forwards the computed wear to the brake pad estimation processor 20. The brake pad estimation processor 20 accrues the wear of brake pads 55 over time as the vehicle is being operated. The brake pad estimation processor 20 uses the accrued wear to determine an estimated thickness of the brake pads 55. The brake pad estimation processor 20 further uses the thickness of the brake pads 55 to estimate life of the brake pads, for example in terms of time, miles, or any other parameter, for example, using a corrosion model specific to the brake pads 55.

The proportioning of the information can be calibrated for different applications and different vehicles. An estimate of the amount of material of the brake wear lost together with the mileage that the vehicle has been driven since the rotors were last changed are recorded on the vehicle. The current estimation can be stored in separate modules on the vehicle. This is used to store the information should a fault occur on one of the modules causing it to be replaced. An estimate of the remaining vehicle mileage can be obtained in a number of ways, such as from driver braking characteristics, linear interpolation or look-up tables of the mileage and the brake rotor thickness estimation.

If the system 60 includes a brake pad sensor that provides signals indicative of actual brake pad thickness, the signals are used to gradually ramp out any differences between the estimation of the brake rotor thickness and the actual thickness over the remaining rotor thickness and life of the brake pads 55. For example, the sensor may be set so that one or more wires break at a specific rotor thickness. If a significant difference exists between the estimate and the actual thickness, as determined when the sensor wires break contact, then this will be used to gradually adjust the estimate so that when the brake pads 55 are near the replacement period, or the next sensor measurement, the total system accuracy will be as high as possible. For example, the estimate of the rotor life remaining is increased or decreased at a rate different from that observed so that the end of the life of the brake pads 55 will be accurately determined.

It should be noted that although the brake sensor discussed above employs wires that break to give an indication of rotor thickness, other types of brake sensors can be used in other examples of the system 60. For example, an indirect sensor or sensing mechanism can be used to infer the brake rotor thickness. Suitable examples include brake fluid level sensors or measuring the displacement of the brake calipers, such as in an electro-mechanical or brake-by-wire system.

Figure 5:
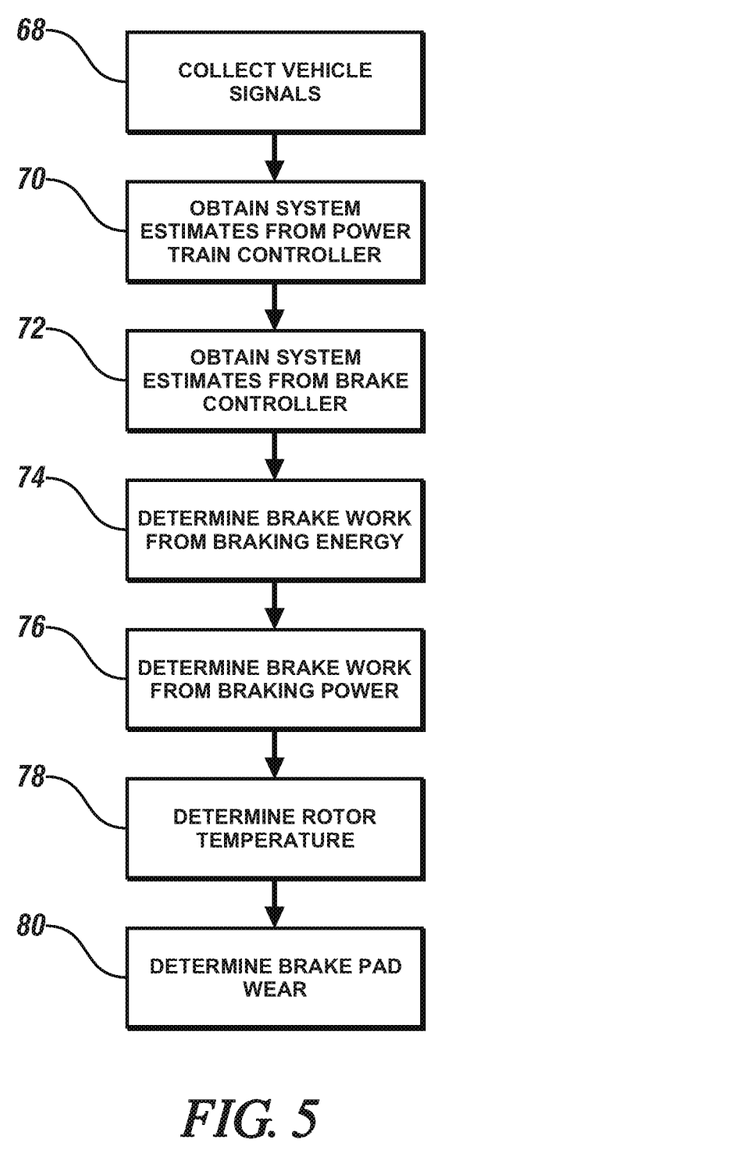
FIG. 5 is a flowchart of a method for estimating a brake pad thickness according to one or more exemplary embodiments.

FIG. 5 depicts a flowchart of an example method for estimating a brake pad thickness, according to one or more embodiments. The method includes receiving and collecting various vehicle signals, such as brake pressure, wheel speeds, vehicle speed, longitudinal acceleration, dynamic brake proportioning, brake being applied, etc., as shown at 68. The method further includes obtaining system estimates from the power train controller 14, such as the vehicle mass, road grade, amount of engine braking, rolling resistance, rotor surface area etc., as shown at 70. The method further includes obtaining system estimates from the brake controller 12, such as the brake temperature, as shown at 72. The method further includes computing the brake work from braking energy, as shown at 74. For example, the braking energy is computed as per the equation (14). The braking energy can be calculated for any one of the several brake pads, every one of the several motor generators 21, or can be one calculation per vehicle axle (e.g., front brake pad work and/or rear brake pad work).

Additionally, or alternately, the method includes determining the brake work using braking power from, for example, equations (2) and (3), as shown at 76. In this calculation, the brake work is determined by braking power and pressure, such as provided by equation (2). Errors can sometimes occur when determining the mass of the vehicle for the braking energy calculation and the friction coefficient value μ can include errors in the brake power estimation. Therefore, a more accurate determination of the brake work may be provided by combining the two work calculations.

The method further includes determining the brake rotor temperature, as shown at 78, and determining the brake pad wear, as shown at 80 in the manner discussed above. Determining the brake pad wear, at 80, includes computing the deceleration parameters, and providing the regenerative blending signals observed from both of the front brake pads and the rear brake pads (e.g., per axle). The regenerative blending energy indicates the amount of the overall braking energy harvested by the regenerative brake system compared to the energy of the rotors and brake pads. The brake pad wear is determined for each braking event, and is added to the accumulated value. The method includes sending the estimated thickness information to the vehicle operator using, for example, the vehicle telematics 52 in communication with the display processor 56.

It should be noted that although the examples so far describe computing the brake pad thickness and using the computed thickness to determine the life of a brake pad, in one or more examples, the brake pad thickness of all the brake pads equipped in the vehicle are analyzed. Accordingly, the vehicle operator is informed of the brake pad thickness and brake pad life estimated for each brake pad that is installed on the vehicle.

The technical solutions described herein facilitate predicting brake pad wear for a disc brake system by combining energy and oxidative wear based models. The technical solutions predict brake disc wear over a wide range of vehicle use and generate an electronic disc wear/disc remaining life signal. The disc wear and/or life remaining may be displayed to the vehicle operator and/or used in various control algorithms that are implemented by one or more electronic control units (ECU) in the vehicle.

The technical solutions can save a vehicle owner from costly repairs resulting from wearing through a brake disc. The technical solutions can further help owners of fleets (such as autonomous vehicle fleets) monitor brake life (in combination with the pad wear monitoring) to plan when to bring vehicles in for service.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for determining thickness of a brake pad comprising:

providing, via a processor, a total braking energy of a vehicle with a regenerative energy braking system and a rotor braking system comprising a plurality of brake pads;

determining, via the processor, work done by the brake pads as a combination of front brake pad work and rear brake pad work;

accumulating, via the processor, brake pad wear to provide an estimation of the brake pad thickness using the front brake pad work and the rear brake pad work; and outputting, via an output system in communication with the processor, a message indicative of the estimation of the brake pad thickness.

2. The method of claim 1, wherein determining the work done by the brake pads comprises providing deceleration parameters.

3. The method of claim 2, wherein determining the work done by the brake pads includes providing regenerative blending signals indicative of a relative portion of overall brake energy.

4. The method of claim 3, wherein determining the work done by the brake pads further includes providing motor data indicative of regenerative brake energy harvested by a motor generator.

5. The method of claim 4, wherein accumulating the brake pad wear comprises providing brake pad friction material, brake pad cooling rate, vehicle mass, road grade, dynamic brake proportioning, vehicle weight distribution, vehicle speed, wheel speed and brake pressure.

6. The method of claim 1, wherein determining the front brake pad work and the rear brake pad work comprises determining brake pad work at a particular wheel of the vehicle.

7. A system for determining thickness of a brake pad comprising:

a controller configured to:

provide a total braking energy of a vehicle with a regenerative energy braking system and a rotor braking system comprising a plurality of brake pads;

determine work done by the brake pads as a combination of front brake pad work and rear brake pad work;

accumulate brake pad wear to provide an estimation of the brake pad thickness using the front brake pad work and the rear brake pad work; and output a message indicative of the estimation of the brake pad thickness via an output system in communication with the controller.

8. The system of claim 7, wherein the controller determines the work done by the brake pads by providing deceleration parameters.

9. The system of claim 8, wherein the controller determines the work done by the brake pads by providing regenerative blending signals indicative of a relative portion of overall brake energy.

10. The system of claim 9, wherein the controller determines the work done by the brake pads further by providing motor data indicative of regenerative brake energy harvested by a motor generator.

11. The system of claim 10, wherein the controller accumulates the brake pad wear by providing brake pad friction material, brake pad cooling rate, vehicle mass, road grade, dynamic brake proportioning, vehicle weight distribution, vehicle speed, wheel speed and brake pressure.

12. The system of claim 8, wherein the controller determines the front brake pad work and the rear brake pad work by determining brake pad work at a particular wheel of the vehicle.

13. A non-transitory computer-readable medium storing instructions executable by a processor for performing a method for determining thickness of a brake pad, the method comprising:

providing, via the processor, a total braking energy of a vehicle with a regenerative energy braking system and a rotor braking system comprising a plurality of brake pads;

determining, via the processor, work done by the brake pads as a combination of front brake pad work and rear brake pad work;

accumulating, via the processor, the brake pad wear to provide an estimation of the brake pad thickness using the front brake pad work and the rear brake pad work; and outputting, via an output system in communication with the processor, a message indicative of the estimation of the brake pad thickness.

14. The computer-readable medium of claim 13, wherein determining the work done by the brake pads comprises providing deceleration parameters.

15. The computer-readable medium of claim 14, wherein determining the work done by the brake pads includes providing regenerative blending signals indicative of a relative portion of overall brake energy.

16. The computer-readable medium of claim 15, wherein determining the work done by the brake pads further includes providing motor data indicative of regenerative brake energy harvested by a motor generator.

17. The computer-readable medium of claim 16, wherein accumulating the brake pad wear comprises providing brake pad friction material, brake pad cooling rate, vehicle mass, road grade, dynamic brake proportioning, vehicle weight distribution, vehicle speed, wheel speed and brake pressure.

18. The computer-readable medium of claim 13, wherein determining the front brake pad work and the rear brake pad work comprises determining brake pad work at a particular wheel of the vehicle.

* * * * *